United States Patent [19]
Nishitani

[11] Patent Number: 5,467,372
[45] Date of Patent: Nov. 14, 1995

[54] MULTI CHANNEL ADPCM COMPRESSION AND EXPANSION DEVICE

[75] Inventor: Shuji Nishitani, Kyoto, Japan

[73] Assignee: Rohm Co., Ltd., Kyoto, Japan

[21] Appl. No.: 278,000

[22] Filed: Jul. 20, 1994

[30] Foreign Application Priority Data

Jul. 21, 1993 [JP] Japan ................................ 5-201144

[51] Int. Cl.$^6$ .................................................. H04B 14/06
[52] U.S. Cl. ........................... 375/244; 375/241; 348/384
[58] Field of Search .............................. 375/27, 25, 122, 375/241; 348/384, 410, 388; 370/118

[56] References Cited

U.S. PATENT DOCUMENTS

| | | | |
|---|---|---|---|
| 4,039,948 | 8/1977 | Boxall | 375/30 |
| 4,955,054 | 9/1990 | Boyd, Jr. et al. | 370/68.1 |
| 4,970,723 | 11/1990 | Lin | 370/85.9 |
| 5,289,549 | 2/1994 | Raffey et al. | 348/384 |

*Primary Examiner*—Stephen Chin
*Assistant Examiner*—T. Ghebretinshe
*Attorney, Agent, or Firm*—Fay, Sharpe, Beall Fagan, Minnich & McKee

[57] ABSTRACT

A multichannel ADPCM compression and expansion device includes N sets of input and output interfaces; an ADPCM compression and expansion device which expansively converts data of K bits in a form of ADPCM signals into PCM signals of M bits in response to a first control signal and outputs the same and compressively converts data of M bits in a form of PCM signals into ADPCM data of K bits in response to a second control signal; and a control unit which divides one signal transmission slot interval into N sections and successively selects the N sets of input and output interfaces in a predetermined order during respective divided intervals divided into N sections and connects to the ADPCM compression and expansion device, and successively performs, while separating the divided interval into a former half and a latter half, a first control which generates the first control signal and sends the data of K bits to the ADPCM compression and expansion device and then returns the expansively converted M bit data to the selected input and output interface, and a second control which generates the second control signal and sends the M bit data to the ADPCM compression and expansion device and then returns the compressively converted K bit data to the selected input and output interface.

11 Claims, 7 Drawing Sheets

FIG.4
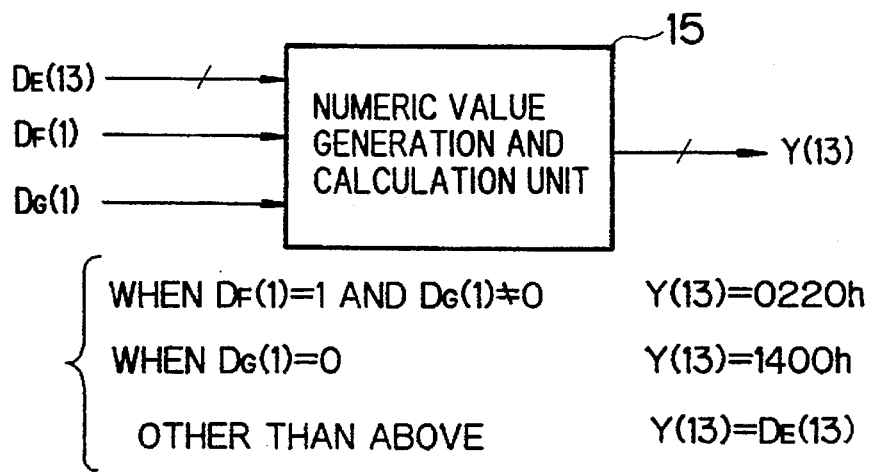
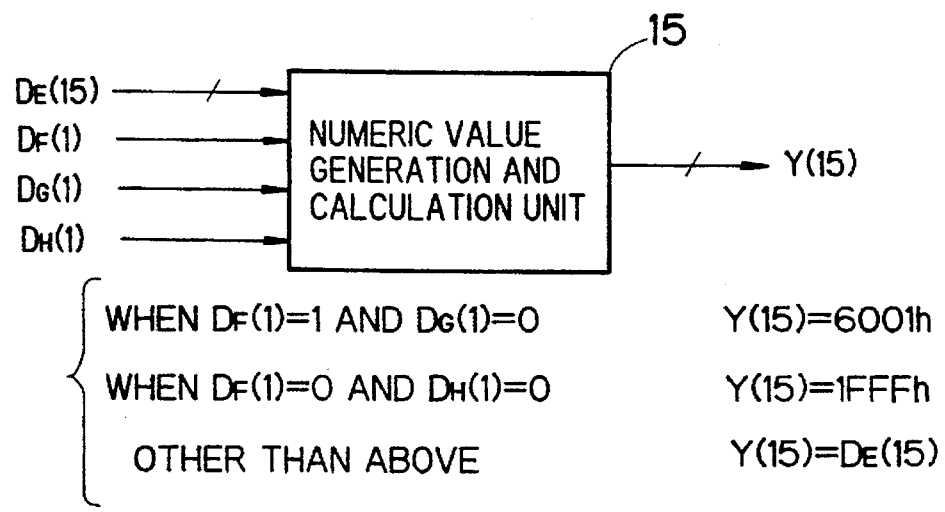
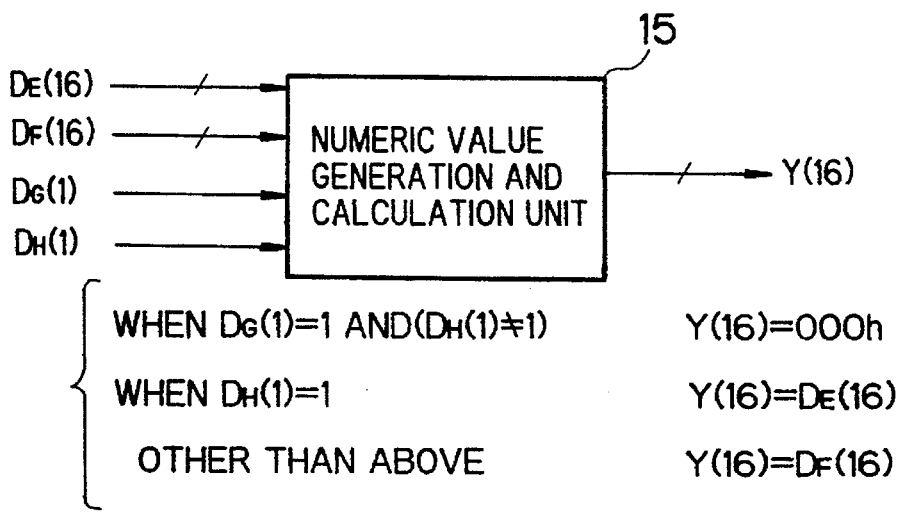

FIG.5

| COUNTER11b | | CONDITION REGISTER "1" | CONDITION REGISTER "0" | CALCULATION UNIT/REGISTER |
|---|---|---|---|---|
| COUNT VALUE | | COMPRESSION PROCESSING | EXPANSION PROCESSING | |
| 1 ~ 22 | | ▨ | ▨ | COMMON PROCESSING FOR COMPRESSION/EXPANSION |
| 23 ~ 27 | | ▧▧▧▧▧ | → SKIP | PROCESSING INHERENT TO COMPRESSION |
| 28 ~ 31 | | | ▧▧▧▧▧ | COMMON PROCESSING FOR COMPRESSION/EXPANSION |
| 32 ~ 37 | | → SKIP | ▧▧▧▧▧ | PROCESSING INHERENT TO EXPANSION |
| 38 ~ 58 | | ▨ | ▨ | COMMON PROCESSING FOR COMPRESSION/EXPANSION |

MULTI CHANNEL ADPCM COMPRESSION AND EXPANSION DEVICE

BACKGROUND OF THE INVENTION

1. Field of the Invention

The present invention relates to a multi channel ADPCM (Adaptive Differential Pulse Code Modulation) compression and expansion device, and, more specifically, relates to a multi channel ADPCM compression and expansion device which allows simultaneous calls in multi channels as well as allows to be formed into an one-chip IC.

The multi channel ADPCM compression and expansion device referred to in the present invention is built-in such as in a main body (parent unit) of a digital cordless telephone set, a base station for telephone communication and a terminal device for cordless telephone, is designed to operate, for example, to compress digital signals of speech voice and transfer the compressed signals to a child unit connected in cordless, to expand like digital signals sent out from the child unit and transfer the expanded signals to the parent unit in it, and then to send out to public telecommunication network such as ISDN, and is to be applied to a so called second generation digital cordless telephone system which allows calls in cordless with other parties in homes, offices and outdoors by making use of digital signals.

2. Background Art

For telephone communication from moving bodies such as car equipped telephone and portable telephone, signal transmission and reception between one parent station and many child stations is performed via TDMA (Time Division Multi Access) control by compressing voice digital data. In the TDMA control the signal transmission and reception is performed by allotting for a child station a predetermined communication period and data amount, for example, in one of the standards of the TDMA control methods "RCR STD-28", section time width of 5 ms and data amount of 160 bits are allotted for one slot voice data which is a unit of signal transmission and reception in one child station.

When analog voice signals are digitized in 4 bit conversion accuracy according to the above standard by making use of sampling frequency of 8 kHz for signal transmission and reception processing of one slot, voice signal sampling of 40 times can be performed in one slot.

By making use of such TDMA control method a second generation digital cordless telephone set using TDD (Time Division Duplex) system which allows the simultaneous calls such as for homes is now under investigation. For realizing such system, a multi channel, in particular, 4 channel or the like ADPCM compression and expansion device is necessitated which allows digital signal transmission and reception between TDMA control devices having the TDD control function. Such multi channel ADPCM compression and expansion device is to be built-in in such devices as a main body cordless telephone set, a base station for telephone communication and a terminal device which are connected a public telecommunication network performing signal transmission and reception via digital signals. The multi channel ADPCM compression and expansion device is designed to perform a bidirectional conversion, in that, to compress PCM signals of voice digital data received from the public network, to convert the compressed signal into ADPCM signals and to send the same to a TDMA control device operating under TDD method, and conversely to receive ADPCM signals from a child unit via a TDMA control device, to expand the received signal to restore the same into PCM signals and send out the same to the public network operating in digital signals.

In this simultaneous call system, the signal transmission and reception between a parent unit and a child unit are performed in cordless by making use of compressed ADPCM signals while being divided by time sharing manner via the TDMA control device and the belonging circuits such as a radio equipment provided, for example, in a parent unit. In the child unit, the ADPCM signals are restored into PCM signals and then the restored PCM signals are demodulated into voice. When transmitting signals from the child unit, voice signals are converted into PCM signals and the PCM signals are further compressed and converted into ADPCM signals and are sent out in cordless to the TDMA control device and belonging circuits provided in the parent unit. The TDMA control device and the belonging circuit expand the received data from the child unit into PCM signals and send out the same to the public network.

Through the provision of an ADPCM processing circuit which can reduce transmission signal bit number in a midway of signal transmission and reception passage in a digital telephone system as explained above, signal data transmission and reception of a greater amount can be achieved in a limited period as well as simultaneous calls in time sharing manner can be realized.

The ADPCM signal conversion device is conventionally known which compresses data and converts into PCM signals and further converts from the PCM signals into ADPCM signals. However, such conventional device is for one channel use in which transmitter side voice signals are compressed and coded in a form of ADPCM signals then transmitted, and in which receiver side the ADPCM signals is expanded and demodulated into voice signals. When applying such conventional ADPCM conversion device in a digital cordless telephone system as it is, a plurality of ADPCM conversion devices have to be provided in parallel.

However, in an actual application, even when a plurality of the devices are provided in parallel, the one channel in the respective devices is insufficient. A plurality of channels of about 4 channels are necessary for outdoor base stations and private base stations, and further for ordinary home use telephone sets which use many child units about 4 channels will be necessitated. It is preferable to provide as many channels as possible. Therefore, in the above instance ADPCM conversion devices covering 4 channels are provided and are multi-controlled of which entire circuit structure becomes excessively large scale. On one hand, a parent unit used in such as homes is required to be no such large scaled device as well as to be low price. Therefore, it is required to constitute the circuit as simple as possible, and possibly it is desired to constitute the circuit which allows to be formed into one-chip IC. However, it is more difficult to form the circuit using the conventional ADPCM conversion devices for multi channels into one-chip IC based on the current technology, because mutual control between respective channels within one signal transmission slot has to be performed.

SUMMARY OF THE INVENTION

An object of the present invention is to resolve the above explained conventional problems and to provide a multi channel ADPCM compression and expansion device having a simple circuit structure which allows transmission and reception of PCM voice signals through a plurality of channels in one signal transmission slot.

Another object of the present invention is to provide a multi channel ADPCM compression and expansion device which allows to be formed into a one-chip IC.

Still another object of the present invention is to provide a multi channel ADPCM compression and expansion device suitable for a home use telephone system which is connected to a digital network and of which parent and child units are connected in cordless fashion.

Features of the multi channel ADPCM compression and expansion device according to the present invention which achieves the above objects are to include N sets (N is an integer of more than 1) of input and output interfaces which are connected in parallel with a transmitter and receiver side line and a digital telecommunication network side line which transmits and receives PCM data in a predetermined signal transmission slot, which receive data of K bits from the transmitter and receiver side line and send out data of M bits (wherein K<M) to the digital telecommunication network side line, and which receive data of M bits from the digital telephone network side line and send out data of K bits to the transmitter and receiver side line; an ADPCM compression and expansion device which expansively converts data of K bits in a form of ADPCM signals into PCM signals of M bits in response to a first control signal and outputs the same and compressively converts data of M bits in a form of PCM signals into ADPCM data of K bits in response to a second control signal; and a control unit which divides the signal transmission slot interval into N sections and successively selects the N sets of input and output interfaces in a predetermined order during respective divided intervals divided into N sections, and successively performs during the divided intervals a first control which generates the first control signal and then sends the data of K bits from the selected input and output interface to the ADPCM compression and expansion device and which receives the expansively converted M bits data from the ADPCM compression and expansion device and then returns the same to the selected input and output interface, and a second control which generates the second control signal and then sends the M bit data from the selected input and output interface to the ADPCM compression and expansion device and which receives the compressively converted K bit data from the ADPCM compression and expansion device and then returns the same to the selected input and output interface, and to complete the compressive conversion and the expansive conversion of the ADPCM compression and expansion device in an interval shorter than ½ of the divided interval.

Since the present invention is designed to provide the N sets of input and output interfaces and to connect successively selected input and output interfaces with the one channel ADPCM compression and expansions device, to successively convert PCM signals and to ADPCM signals vice versa by the one channel ADPCM compression and expansion device and to return the converted signals to the originally connected input and output interface, the former half and the latter half of the divided interval can be allotted respectively for the signal transmission and for the signal reception which allows the simultaneous call processing in time sharing manner. Moreover, the ADPCM compression and expansion device only neccessitates one channel and requires a processing of alternatingly repeating compression and expansion which simplifies the control as well as the circuit structure thereof.

In particular, when breaking down the compression conversion for the ADPCM signals and the expansion conversion for the PCM signals into many individual calculation processing steps, classifying into common calculation processing steps, compression conversion proper calculation processing steps and expansion conversion proper calculation processing steps and when allotting same processing steps for calculation processing steps which can be commonly performed for the compression conversion and the expansion conversion, many of the compression conversion and expansion conversion processings can be commonly managed and the entire conversion processings can be treated as unified and simplified processings which are arranged in continuous series processing steps and can be managed by such as a counter, thereby the scale for the control circuit is reduced.

As a result, the circuit scale can be reduced to an extent which allows to be formed into one-chip IC. Further, since N time ADPCM compression and expansion processings can be performed in time sharing manner for the input and output interfaces within one signal transmission slot, an N channel processing can be realized with respect to the input and output interfaces.

BRIEF DESCRIPTION OF THE DRAWINGS

FIG. 4 is a view for explaining a numeric value generation and calculation unit which generates a specific numeric value in response to an input condition;

FIG. 5 is a view for explaining allocation of respective calculation processing steps when the compression and expansion processings are developed into fundamental calculation processings;

DESCRIPTION OF THE PREFERRED EMBODIMENT

Figure 1:
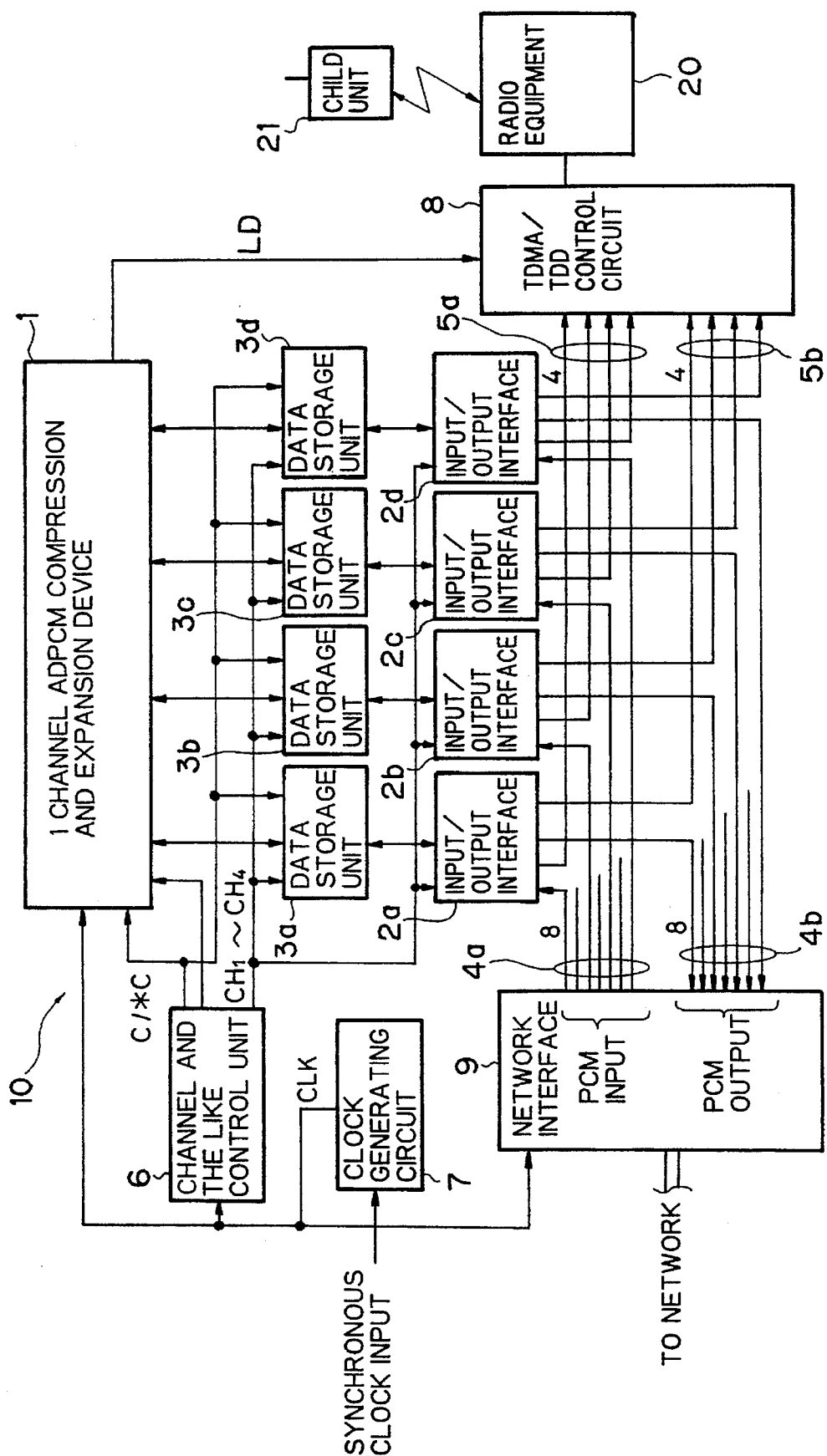
FIG. 1 is a block diagram of 4 channel APDCM compression and expansion device which is one embodiment of a multi channel ADPCM compression and expansion device according to the present invention.

In FIG. 1, 10 denotes 4 channel ADPCM compression and expansion device wherein 1 is 1 channel ADPCM compression and expansion device (hereinbelow, simply called as ADPCM device), 2a, 2b, 2c and 2d are input and output interfaces which are provided for respective channels from channel 1 through channel 4, 3a, 3b, 3c and 3d are data storage units which are provided for the respective input and output interfaces, 4a is a 8 bit PCM input bus line which is connected 8 bit output of a network interface 9 connected to a digital telecommunication network such as an ISDN, 4b is a 8 bit PCM output bus line which is connected to 8 bit input bus line of the network interface 9, 5a is an ADPCM output bus line (of 4 bits) connected to 4 bit input bus line of a TDMA/TDD control circuit which is built-in such as in a base station and a main body or parent unit of a cordless telephone set, 5b in an ADPCM input bus line (of 4 bits) connected to 4 bit output bus line of the TDMA/TDD control circuit 8, 6 is a channel and the like control unit, and 7 is a clock generating circuit which generates clocks CLK in synchronism with synchronous clocks from the network. Further, in the drawing for the sake of convenience for explanation each of the buses 4a, 4b, 5a and 5b illustrates signal flow and not illustrates the bus line itself.

The channel and the like control unit 6 receives clocks CLK from the clock generating circuit 7, divides the same and generates such as sampling rate pulses S, internal sampling pulses s (see FIG. 6), selection pulses CH1–CH4 and control pulses C/*C. The cycle of the sampling rate pulses S corresponds to the section of the time width T (=5 ms, see FIG. 2) for one slot of the signal transmission and reception (frequency of 8 kHz), and further synchronizes with and corresponds to the synchronous clocks at the network side.

The selection pulses CH–CH4 synchronize with the sampling rate pulses S and are successively rendered to HIGH level (hereinbelow simply referred to as "H") only within ¼ period of the cycle T for the one slot so as to select a drive channel. The selection pulses CH1–CH4 are successively sent out to the input and output interfaces 2a, 2b, 2c and 2d allotted respectively to channel 1 through channel 4 and to the data storage units 3a, 3b, 3c and 3d provided for the respective input and output interfaces according to the channel selection order. Thereby, the respective channels, which are composed of the respective input and output interfaces and the data storage units, are successively enabled only in the period of T/4.

The control pulses C/*C, wherein *C is an inverted signal of C and when C is rendered Low level (hereinafter simply referred to as "L") the control pulses become significant, synchronize with the selection pulses CH1– CH4, have ½ pulse width of the selection pulse, in that pulses of 50% duty and turn ON/OFF at a cycle of T/4. The control pulses are sent out from the channel and the like control unit 6 to the respective data storage units 3a through 3d and the ADPCM device 1. Other control signals which are sent out from the channel and the like control unit 6 are explained later.

The data storage unit 3a becomes operative when the selection pulse CH1 is rendered to "H". The control pulse C/*C is rendered to "H" during former half in the "H" period of the selection pulse CH1 and is rendered to "L" during latter half in the "H" period of the selection pulse CH1. The data storage unit 3a fetches 8 bit data stored in a predetermined storage region in the input and output interface 2a, in response to the control pulse C/*C during "H" period thereof. The ADPCM device 1 performs ADPCM compression on 8 bit data fetched by the data storage unit 3a to modify into 4 bit data and sends out the same to the data storage unit 3a. The data storage unit 3a returns the compressed 4 bit conversion data to the input and output interface 2a. Thereafter, the control pulse C/*C is rendered to "L". During the "L" period the data storage unit 3a again fetches 4 bit data stored in a predetermined storage region in the input and output interface 2a. The ADPCM device 1 performs ADPCM expansion on the fetched 4 bit data to modify into 8 bit data and sends out to the data storage unit 3a. The data storage unit 3a returns the expanded 8 bit conversion data to the input and output interface 2a.

The data storage unit 3b likely becomes operative when the selection pulse CH2 is rendered to "H", fetches data in the same manner as above from the input and output interface 2b in response to the control pulse C/*C during "H" period and "L" period thereof respectively, receives conversion completed data from the ADPCM device 1 and returns the same to the input and output interface 2b. In the same manner, the data storage units 3c and 3d become operative when the selection pulses CH3 and CH4 are rendered to "H" and perform the like operation as the data storage units 3a and 3b as explained above.

An overview of operation with regard to signal transmission and reception according to the present embodiment is at first explained with reference to the signal waveforms illustrated in FIG. 2.

The network interface 9 sends out received data from the network to the PCM bus line 4a at the timing before the control pulse C/*C rises to "H". The input and output interfaces 2a, 2b, 2c and 2d successively receive received data from the PCM input bus line 4a during their selected periods by the selection pulses CH1–CH4 at the timing when the respective control pulses C/*C rise. Received 8 bit data from the network set at an input and output interface 2, which is referred to as an input and output interface among the input and output interfaces 2a, 2b, 2c and 2d which is driven by one of the selection pulses CH1–CH4, is transferred from the input and output interface 2 to a data storage unit 3, which is referred to as a data storage unit among the data storage units 3a, 3b, 3c and 3d which corresponds to the input and output interface 2, in response to data fetch timing signal RT illustrated in FIG. 2 which is to be sent out from the channel and the like control unit 6 at the timing immediately after the control pulse C/*C rises.

Then, the received 8 bit data is read in from the data storage unit 3 to the ADPCM device 1 and is compressively converted into 4 bit ADPCM signals, of which compressive conversion will be explained later. The data storage unit 3 transfers the returned 4 bit compressed data to the input and output interface 2 and the received 4 bit data returned to the input and output interface 2 is sent out to the ADPCM output bus line 5a at the timing before the control pulse C/*C falls from "H" to "L". The ADPCM device 1 sends out a timing signal LD (see FIG. 6) to the TDMA/TDD control circuit 8 at the timing before the control pulse C/*C falls from "H" to "L".

The TDMA/TDD control circuit 8 receives compressively converted 4 bit ADPCM signals from the input and output interface 2 in response to the timing signal LD, then sends out ADPCM compressed 4 bit transmitting data from the child unit 21 to the ADPCM input bus line 5a and writes the data in the input and output interface 2 from which the non-compressed data is received. Further, the TDMA/TDD control circuit 8 is connected with the child unit 21 via the radio equipment 20 through which ADPCM compressed 4 bit voice signal data is bidirectionally transmitted with the child unit 21.

Figure 2:
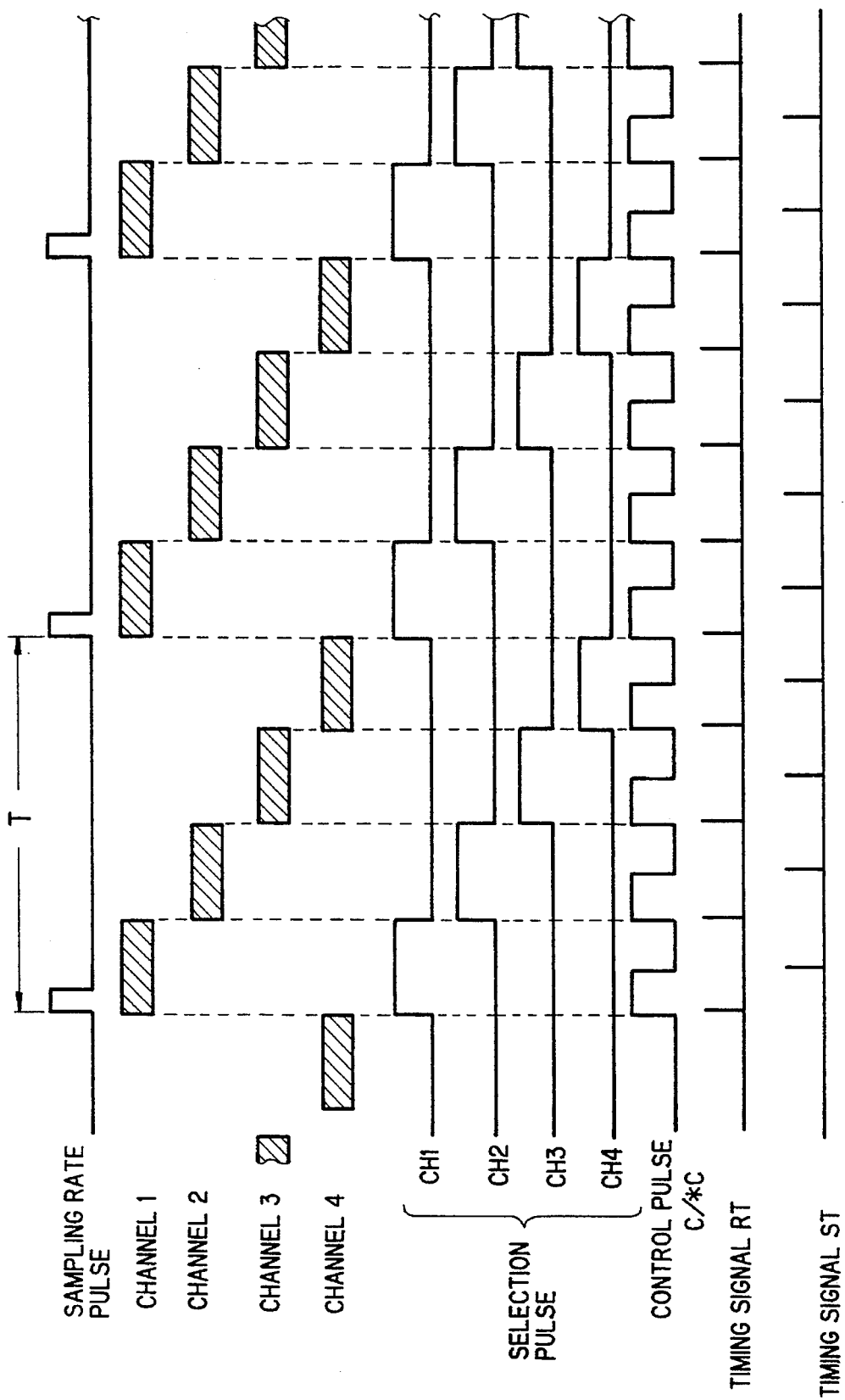
FIG. 2 is a timing chart of data processing for the embodiment shown in FIG. 1.

4 bit transmitting data from the child unit 21 set at the input and output interface 2 is transferred from the input and output interface 2 to the data storage unit 3 in response to transmitting data fetch timing signal ST as illustrated in FIG. 2 which is generated at the timing immediately after the control pulse C/*C falls. The 4 bit transmitting data is read in into the ADPCM device 1, is expansively converted from the 4 bit ADPCM signal to 8 bit PCM signal and is again returned to the data storage unit 3, of which expansive conversion will also be explained later. The data storage unit 3 transfers the returned 8 bit data to the corresponding input and output interface 2.

The 8 bit transmitting data returned to the input and output interface 2 is sent out from the input and output interface 2 to the PCM output bus line 4b, then inputted to the network side interface 9 and sent out to the network. Thereafter, the selection pulses CH1–CH4 are switched and the subsequently selected input and output interface 2 receives 8 bit receiving data from the network side interface 9 at the timing when the control pulse C/*C rises to "H" and in response to data fetch timing signal RT immediately thereafter again sends out the 8 bit receiving data to the data storage unit 3.

Further, the network interface 9 sends out 8 bit receiving data from the network side to the PCM input bus line 4a in synchronism with the sampling rate pulses S and at the timing when the selection pulses CH~CH4 respectively rise, and receives 8 bit transmitting data from the PCM output bus line 4b at the timing before the selection pulses CH1~CH4 respectively rise. Accordingly, the network interface 9 includes 4 channel multi timing control signals, however the network interface 9 can perform the above control by directly receiving the selection pulses CH1~CH4 from the channel and the like control unit 6.

Still further, the ADPCM device 1 performs the ADPCM compression and expansion processings within the one sampling in response to the internal sampling pulse s. The respective processings of compression and expansion are performed within one machine cycle which is determined by 58 pieces of clock pulses CLK which are received from the clock generating circuit 7. Thus, calculation processings at respective stages for ADPCM compression and expansion are performed in response to the respective received clocks CLK. Because of the nature of the ADPCM calculation such data as past PCM and ADPCM data and in addition history data on several calculation results at a few sampling timings before the present moment other than the above data are necessitated for the conversion processing. These past sampling data and past history data are stored in a predetermined area in the data storage units.

Thus, 4 channel ADPCM compression and expansion device 1 converts the received 8 bit PCM data into 4 bit ADPCM voice data and sends out the same to the child unit 21 via the TDMA/TDD control circuit 8 in the time divided regions for channel 1 through channel 4 indicated by hatching and when the control signal C/*C is at "H", and conversely receives the 4 bit ADPCM voice data transmitted from the child unit 21 via the TDMA/TDD control circuit 8, converts the same into 8 bit PCM signals and then sends out to the network side.

By thus compressing the 8 bit data into 4 bit data, the time sharing simultaneous call with the child unit can be realized. Further, with the use of ADPCM compression processing data amounting to two times can be dealt theoretically, however, since the processing time for a unit data is shortened, actually data transmission more than the theoretical value with the child unit can be achieved.

Figure 7:
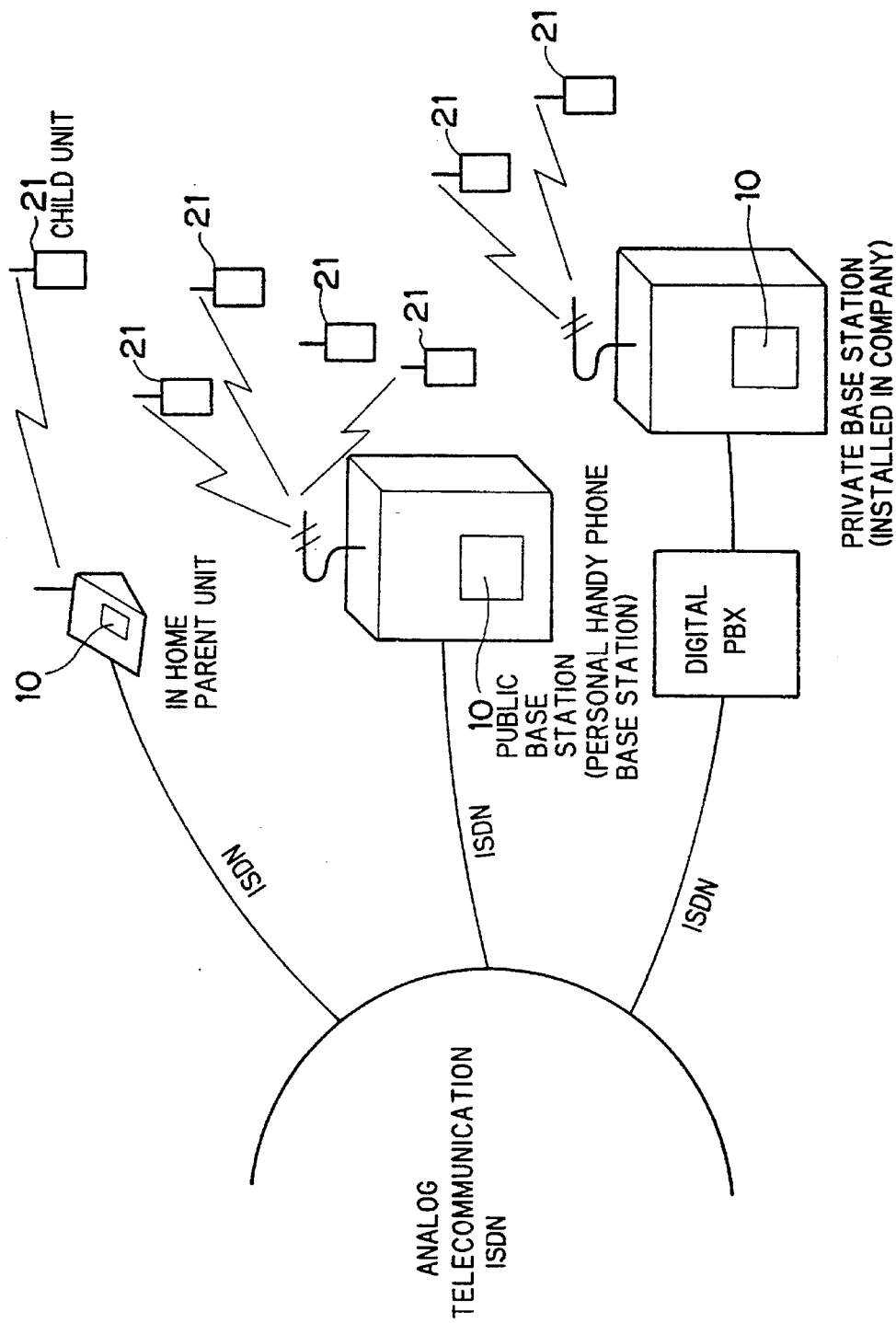
FIG. 7 is an overview constitutional diagram of a personal handy telephone system to which the present invention is applied.

FIG. 7 shows an overview constitution of a personal handy telephone system using the 4 channel ADPCM compression and expansion device 10 in the above explained circumstance.

In a home use cordless telephone set, the signal transmission and reception circuit the TDMA/TDD control circuit 8 and to the child unit 21, 4 channel ADPCM compression and expansion device 10 and the interface such as for ISDN is built-in in the parent unit or the main body unit which is then connected to a digital network via the network interface 9. Further, when such main body unit is installed in a public telephone booth, a telephone call from a home use cordless telehone set can be realized in cordless via the public telephone booth.

Figure 3:
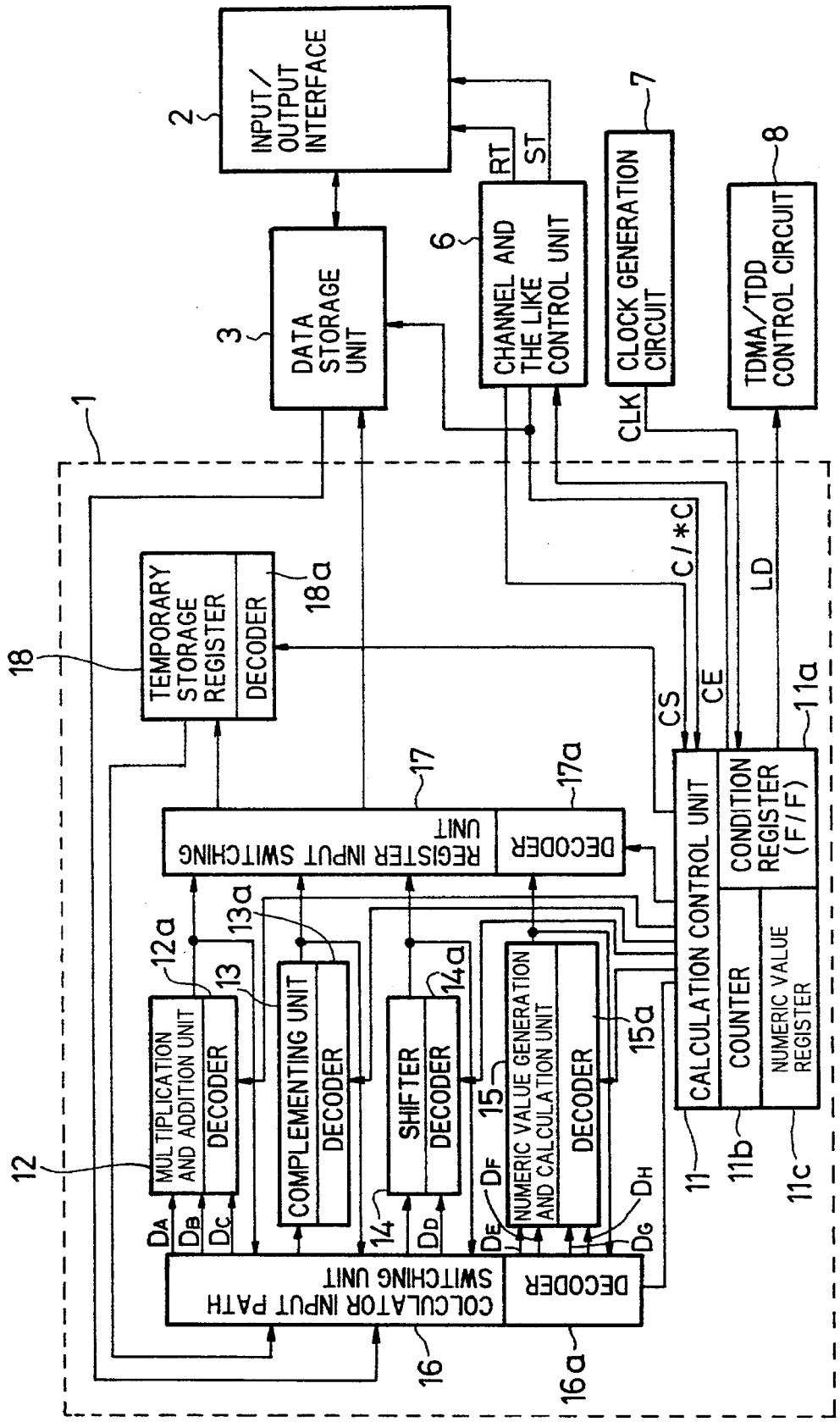
FIG. 3 is a block diagram of an internal structure of 1 channel ADPCM compression and expansion device in the embodiment shown in FIG. 1.

FIG. 3 shows a constitution of the device 1, wherein 11 is a calculation control unit, 12 is a multiplication and addition unit, 13 is a complementing unit, 14 is a shifter, 15 is a numeric value generation and calculation unit which performs such as a floating point calculation processing and generates a specific numeric value in response to the input data condition, 16 is a calculator input path switching unit, 17 is a register input switching unit and 18 is a temporary storage register. The above respective calculating units and the register other than the calculation control unit 11 are respectively provided with decoders 12a, 13a, 14a, 15a, 16a, 17a and 18a therein.

The calculation control unit 11 is primality composed of logic arraies formed by AND logic arraies and OR logic arraies and comprises therein such as a condition register (flip-flop FF) 11a, a counter 11b and a numeric value register 11c. The condition register 11a is activated upon receipt of the control pulses C/*C and stores "1" when the control pulse C/*C is at "H" and stores "0" when at "L". These conditions are sent out to the respective decoders. The counter 11b counts the clocks CLK and manages the respective stages of the ADPCM compression and expansion processings. The counted value is sent out to the respective decoders. The counter 11b starts from 1 and counts up to 58 during compression conversion and in the same way during expansion conversion starts from 1 and counts up to 58 which will be explained later. The respective decoders generate an enable signal when the count value reaches to that assigned to the respective decoders concerned and actuate the calculation unit and register to which the decoder concerned belongs.

The numeric value which the numeric value register 11c holds is one which is to be set at the counter 11b as the subsequent count value when the counter 11b reaches to a predetermined count value. This numeric value held in the numeric register 11c is differentiated for the compression conversion processing and for the expansion conversion processings. More specifically 38 is assigned for the compression conversion processing and 28 for the expansion conversion processing.

The multiplication and addition unit 12, the complementing unit 13, the shifter 14 and the numeric value generation and calculation unit 15 are calculation units which are respectively composed of gate arraies and output calculation results after a predetermined operation delay time. Accordingly, when input data is determined, an output result is obtained after a predetermined time via their logical operation. The calculation content whether multiplication, addition or subtraction in the multiplication and addition unit 12 is selected in response to the count value inputted from the counter 11b or the value of the input data DC among a plurality of input data, and the selected processing is performed for the input data DA and DB.

The complementing unit 13 generates a complement for the input data. The shifter 14 is for performing bit shifting for executing a dividing operation and the shifting amount is determined in response to the count value inputted from the counter 11b or the input data DD.

The numeric value generation and calculation unit 15 normally generates the input data DE as it is among the input data DE, DF, DG and DH under a condition of data values of DF, DG and DH with respect to data value of DE, performs a predetermined calculation on DE, for example, calculation such as floating point processing according to data of DF, DG and DH and a special calculation in ADPCM algorithm which can not be processed in the calculation units 12~14 or further performs a calculation generating a predetermined numeric value.

The calculator input path switching unit 16 and the register input switching unit 17 include a multiplicity of input bit terminals and a multiplicity of output bit terminals and are primarily composed of logic arrays formed of AND logic arrays and OR logic arrays. The input and output terminals of the calculating units and the output terminals of the register are connected to respective input bit terminals and output bit terminals.

The calculator input path switching unit 16 selects necessary data portion among inputted data in response to count value inputted from the counter 11b and sets a path through which the selected data portion is outputted to a necessary calculation unit. The calculator input path switching unit 16 is constituted in a form of path switching circuit which couples between an input side and an output side with a predetermined path in response to the count value.

The register input switching unit 17 is similar to the calculator input path switching unit 16, and in particular, couples the output of a necessary calculation unit among the respective calculation units with either the temporary storage register 18 or the data storage unit 3 according to the path setting and outputs the calculation result data to either of them.

Now, the path switching is more specifically explained. When the count value of the counter 11b is, for example, 2, the upper 16 bits among the data in the temporary storage register 18 are determined as DA, the subsequent 16 bits are determined as DB and are sent out to the multiplication and addition unit 12 and a few bit data at predetermined digit positions among the data in the temporary storage register 18 are determined as DC and a calculation processing is performed thereon. Then, according to the above result, the path in the calculator input path switching unit 16 is set. When the count value in the counter 11b rises, for example, to 5, the calculation result in the multiplication and addition unit 12 is added to the shifter 14 via the path of the calculator input path switching unit 16 as well as a path is established which adds the bit data at predetermined digit positions of the calculation result to the numeric value generation and calculation unit 15. When the count value in the counter 11b rises to 8, a predetermined bit series is formed from the calculation result of the shifter 14 and the data generated from the numeric value generation and calculation unit 15, and is outputted to the temporary storage register 18.

The above calculation processing is repeated in response to renewal of the count value in the counter 11b, the processings at respective stages in the ADPCM algorithm are successively performed and the compression conversion processings from PCM to ADPCM or the conversing expansion conversion processings to PCM are realized. The calculation results of the respective calculation units are selectively returned to the calculator input path switching unit 16 for use in the subsequent calculation or stored in the temporary storage register 18 via the register input switching unit 17 and then the data stored in the temporary storage register 18 is returned to the calculator input path switching unit 16. Then, the data necessary for the subsequent calculation is selected among the data in the temporary storage register 18 by the calculator input path switching unit 16 and is added to the calculation unit which performs the subsequent calculation. The calculation result which is necessary for further later calculation processings is left as it is in the temporary storage register 18.

The outputs of the multiplication and addition unit 12, the complementing unit 13, the shifter 14 and the numeric value generation and calculation unit 15 are sent out at a predetermined instance to the register input switching unit 17 according to the contents of the calculation processing result. The output of the register input switching unit 17 in sent out to the temporary storage register 18 and the data stored in the temporary storage register 18 is again set at the calculator input path switching unit 16 together with the past calculation result data. Such calculation processing is repeated many times. Then, at the moment the ADPCM conversion has been completed the data of the conversion result is output from the register input switching unit 17 to the data storage unit 3. The conversion result data includes calculation result data which is necessary for the subsequent conversion as well as the compressed data or the expanded data for the present conversion.

In such circuit constitution as explained above, the calculation control unit 11 controls in parallel the respective calculation units, the shifter 14 and the numeric value generation and calculation unit 15 based on the count value from the counter 11a. With such control the compressive conversion from PCM to ADPCM or conversing expansive conversion can be performed in high speed during the respective periods for channel 1~channel 4 as illustrated by hatching in response to the control pulse C/*C from the channel and the like control unit 6.

Since the calculation processing contents performed for the input data of the multiplication and addition unit 12, the complementing unit 13 and the shifter 14 are already known, the explanation about the respective operations of these units is omitted. However example of numeric value generation which is characteristic to the ADPCM processing of the numeric value generation calculation unit 15 is hereinbelow explained with reference to FIG. 4. Further, the numeric value in ( ) behind DE, DF, DG and DH in FIG. 4 denotes bit number thereof.

Now, it is assumed that in the data storage unit 3 are stored as the data for compression processing at signal reception four pieces of 8 bit PCM received data until present time totalling 32 bits and 21 bit resultant data obtained by the past calculation. Further, it is assumed that as the data for the expansion processing at signal transmission eight pieces of 4 bit ADPCM data until present time totalling 32 bits and 21 bit resultant data obtained by the past calculation are stored in the data storage unit 3. When the data storage unit 3 receives a new data during a new signal transmission or reception via the input and output interface 2, the oldest data therein is erased and the predetermined pieces of the data are always kept in the data storage unit 3.

Data in the 32 bit data which is necessary at respective stages for the compression calculation processing or for expansion calculation processing is timely fed and stored in the temporary storage register 18. Still further, it is assumed that the bit number of the necessary data during the initial stage is as same as the calculation result of 21 bits and the temporary storage register 18 can store 53 bit data at the maximum during the initial stage.

Under the condition that the count value of the counter 11b is m (1<m<58) and according to the values of DE(13), DF(1) and DG(1), the numeric value generation calculation unit 15 operates in such a manner that when DF(1)="1" and DG(1)≠"0", the numeric value generation calculation unit 15 generates Y=0220 h (h implies hexadecimal notation) as its output Y, when DG(1)="0", generates Y=1400 h and other than the above two instances generates DE(13) as its output Y=DE(13).

Further, under the condition that the count value of the counter 11b is n (1<n<58) and according to the values of DE(15), DF(1), DG(1) and DH(1), the numeric value generation calculation unit 15 operates in such a manner that when DF(1)="1" and DG(1)="0", the numeric value generation calculation unit 15 generates Y=6001 h, when DF(1)="0" and DH(1)="0", generates Y=1 FFFh and other than the above two instances generates DE(15) as its output Y=DE(15).

Still further, under the condition that the count value of the counter 11b is k (1<k<58) and according to the values of DE(16), DF(16), DG(1) and DH(1), the numeric value generation calculation unit 15 operates in such a manner that when DG(1)="1" and DH(1)≠1, the numeric value generation calculation unit 15 generates Y=0000 h, when DH(1)= "1", generates Y=DE(16) and other than the above two instances generates DF(16) as its output Y=DF(16).

FIG. 5 shows a relationship between the count value of the counter 11b and the ADPCM algorithm at their respective stages wherein common steps for the compression processing and the expansion processing and inherent steps for the respective processings are separated.

In FIG. 5, the respective stages for the ADPCM compression and expansion processings are broken down to common and fundamental calculation processing steps such as addition and subtraction, multiplication and division, and are respectively developed over the calculation processing or input/output processing steps of 1 through 58, and then the respective processing steps are related to the count values of the counter 11b. The count values 1 through 22, 28 through 31 and 38 through 58 of the counter 11b are for the common calculation processing steps in which like calculation processings for the compression processing and for the expansion processing are performed. When the count values of the counter 11b are 23 through 27, the calculation processing stage inherent to the compression processing is performed such that when the count value of the counter 11a takes 23 during the compression processing, the expansion processing is skipped. The skipping processing is performed by setting numeric value 28 at the counter 11b which is registered in the numeric value register 11c after the counter 11a counts numeric value 22 under the condition of the condition register 11a of "1" and at the moment when the counter 11b receives a clock CLK. Likely, since the count values 32 through 37 of the counter 11b are for the calculation processing stage inherent to the expansion processing, when the counter 11a takes the count value 32 during the expansion processing the compression processing is skipped. The skipping processing is performed by setting numeric value 38 at the counter 11b which is registered in the register 11c after the counter 11b counts numeric value 31 under the condition of the condition register 11a of "0" and at the moment when the counter 11b receives a clock CLK.

If the calculation processing steps are divided into further finer fundamental steps than the 58 stages, number of the calculation processing steps which can be commonly performed increases, and if divided into further rougher fundamental steps, the number of the calculation processing steps which can be commonly performed decreases. The degree of the fineness or the roughness of the common calculation processing steps is determined individually based on an analysis of the ADPCM algorithm concerned. When the step number is increased, it takes time for the respective compression and expansion processings and when the step number is decreased, the processing time is shortened, however special calculating units are needed which makes the control circuits complex. The above step number 58 is one of aims which can realize formation of the circuits in one-chip IC. Further, since the algorithm itself for the ADPCM compression and expansion processing is known and a specific processing content, for example, a calculation method of encoding (compressing) 8 bit PCM signals to 4 bit ADPCM signals and of decoding (expanding) conversely is defined in "Recommendation G.721 on CCITT 1988 edition". The actual contents of the respective steps for the above calculation processings can be determined with reference to the above Recommendation, since the details of which will complicate the explanation and relate to design matters, the explanation thereof is omitted.

Figure 6:
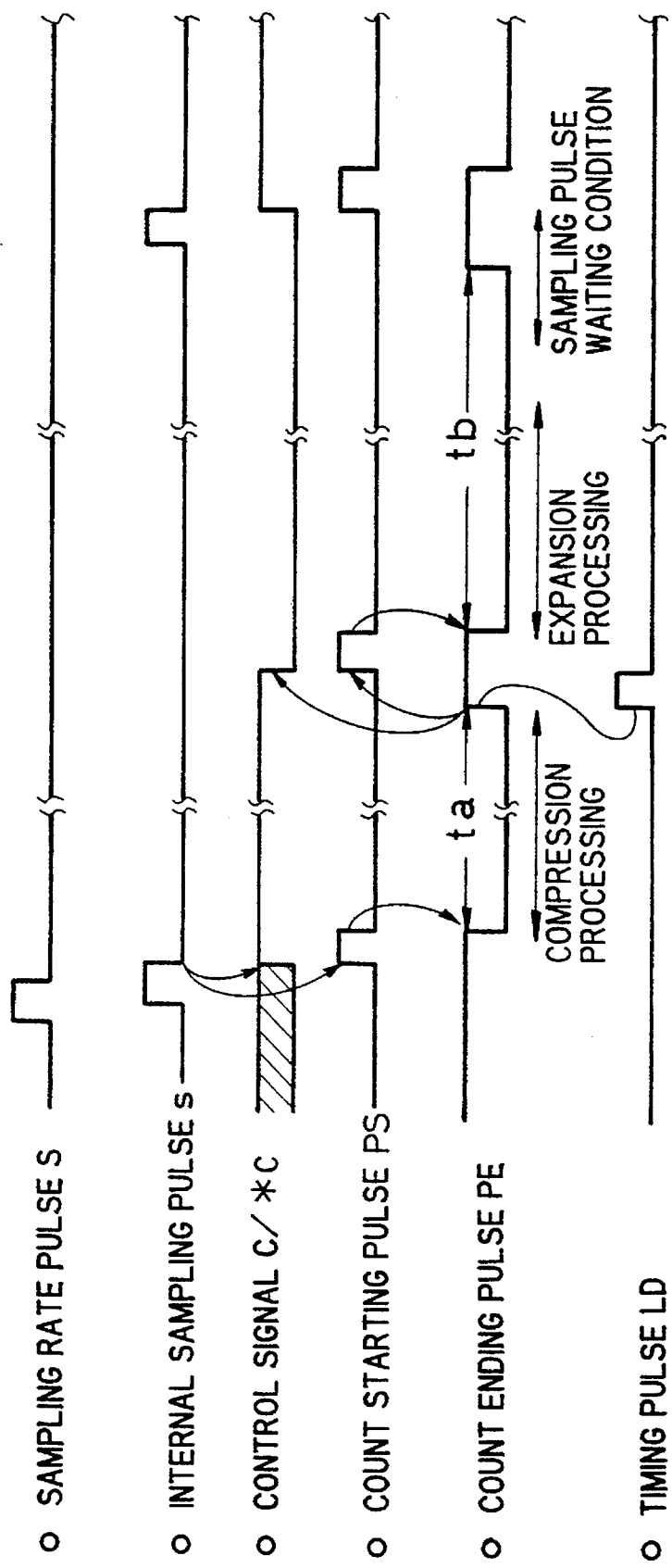
FIG. 6 is a timing chart of the compression and expansion processings.

An overview operation of the compression and expansion processing is explained with reference to a time chart illustrated in FIG. 6.

Initially, a first 8 bit PCM receiving data is sent out from the network interface 9 in synchronism with the sampling rate pulse S. The channel and the like control unit 6 generates the selection pulses CH1~CH4 as illustrated in FIG. 2 in synchronism with the sampling rate pulse S, and further inside the channel and like control unit 6 the internal sampling pulse s is generated in response to the leading edge of the respective selection pulses CH1~CH4.

Actually, the receiving data from the network is set at the input and output interface 2 at the same time with the leading edge of this internal sampling pulse s. Then, the channel and the like control unit 6 rises the control signal C/*C to "H" in response to the trailing edge of the internal sampling pulse s, and at the same time generates count starting pulse CS and sends out the same to the calculation control unit 11. When the control signal C/*C is rendered to "H", the condition register 11a in the calculation control unit 11 is set at "1". In response to the generation of the count starting pulse CS a timing signal RT is fed to the input and output interface 2, then the 8 bit received data from the network is transferred to the data storage unit 3 and the transferred 8 bit data causes to fall the count starting pulse CS to "L" after a predetermined time stored in the data storage unit 3. Through this fall (trailing edge) of the count starting pulse CS the counter 11a in the calculation control unit 11 is enabled and starts counting of the clocks CLK from the clock generating circuit 7. Now, when the count value of the counter 11b is rendered to "1", the 32 bit past data and past calculation result data in the data storage unit 3 are applied to the calculator input path switching unit 16 and through the path set by the calculator input path switching unit 16 the calculated data is input into, for example, the multiplication and addition unit 12 and the numeric value generation calculation unit 15. As a result, calculation result and data necessary for the subsequent calculation, for example, of 21 bit data, are produced, thus totalling 53 bit data is generated. Subsequently, when the count value of the counter 11b which counts the clocks CLK is rendered to "2", the 53 bit data is sent and stored in the temporary storage register 18 and the data is further applied as it is to the calculator input path switching unit 16. The calculator input path switching unit 16 sets a predetermined path according to the count value "2". As a result, necessary bit data among the 53 bit data is sentout to the respective calculation units which require such data.

The count value of the counter 11b is successively renewed in response to reception of clocks CLK as explained above and in synchronism therewith the calculation processing is renewed and the ADPCM compression processing is performed, and then at the moment when the count value of the counter 11b has reached to 58, the 4 bit ADPCM compression data inputted into the register input switching unit 17 together with the calculation result data is transferred to a predetermined storage area in the data storage unit 3 via the register input switching unit 17. At the timing immediately thereafter, the calculation control unit 11 sends out a count ending pulse CE to the channel and the like control unit 6.

The channel and the like control unit 6 sends out a control signal to the data storage unit 3 and the input and output interface 2 upon receipt of the count ending pulse CE and transfers the 4 bit ADPCM compressed data from the data storage unit 3 to the input and output interface 2. The calculation control unit 11 sends out the timing signal LD to the TDMA/TDD control circuit 8 at the timing when the 4 bit data is set at the input and output interface 2. The channel and the like control unit 6 causes to fall the control signal C/*C to "L" after receiving the count ending pulse CE and at the timing when the 4 bit transmitting data from the TDMA/TDD control circuit 8 is set at the input and output interface 2, at the same time sends out count starting pulse CS to the calculation control unit 11 as well as generates the timing signal ST to cause the input and output interface 2 to transfer the 4 bit transferring data to the data storage unit 3. Then the 4 bit transmitting data causes to fall the count starting pulse CS at the stored timing. When the control signal C/*C is rendered to "L", the value of the condition register 11a is set at "0", the counter 11b begins counting from "1" in response to the trailing edge of the count starting pulse CS.

Now, the data until the present time amounting to 32 bits is read from the data storage unit 3, and then the processing of expanding the 4 bit transmitting data to 8 bit PCM signals is performed. Thereafter at the moment when the count value of the counter 11b has reached to 58, the 8 bit PCM expanded data outputted to the register input switching unit 17 is transferred to a predetermined storage area in the data storage unit 3. At the timing immediately thereafter, the calculation control unit 11 sends out the count ending pulse CE to the channel and the like control unit 6. The channel and the like control unit 6 sets the 8 bit PCM expanded data at the input and output interface 2 upon receipt of the count ending pulse CE. The set 8 bit data is sent out from the input and output interface 2 to the network interface 9 via the bus 4b. Then, the 8 bit receiving data is sent out from the network interface 9 to the bus 4a. Thereafter, the subsequent selection pulse, one of CH~CH4, is generated and then a subsequent input and output interface 2 is selected to which 8 bit receiving data is again set at the timing of rise of the internal sampling pulse s, then the like processings as explained above are repeated.

Herein, the periods ta or tb covering from count start to count end of the counter 11b are set shorter than half (=T/8) of the period (T/4) of the internal sampling pulse s. Therefore, the count ending pulse CE is generated before fall of the control signal C/*C. Further, as illustrated in FIG. 5, since the compressive conversion uses 52 steps and the expansive conversion uses 53 steps which is substantially the same and the count numbers for the compressive processing and for the expansive processing are substantially the same value, the compressive processing can be completed in the former half of the period T/4 of the internal sampling pulse s and the expansive processing also can be completed in the latter half of the period. Alternatively, the expansive processing can be assigned to the former half of the period and the compressive processing to the latter half.

As will be understood from the above, with regard to the common calculation for the compression and the expansion both the stages for compression algorithm and the stages for expansion algorithm are processed according to the same count value of the counter, and with regard to the steps inherent to the compression and the steps inherent to the expansion, respective processing steps having count values continuing from the common steps for the compression and expansion are assigned. In these continuing steps inherent to the respective processings, the steps inherent to the expansion processing is skipped during the compression processing, in that the expansion processing bypasses the compression processing and the steps inherent to the compression processing is skipped during the expansion processing, in that the compression processing bypasses the expansion processing. Thereby, a unified management can be realized which allows use of continuous count values of a common counter. Accordingly, the control circuit for the the ADPCM processing is simplified. Further, with the provision of the numeric value generation calculation unit for performing special calculation in the ADPCM processing the structure of the other calculation units is simplified to thereby reduce the circuit scale thereof. Still further, the respective calculation units are constituted by a circuit which can perform calculation only through logical operation and thus eliminate necessity of clock input to thereby further reduce the circuit scale thereof.

In the embodiment as explained hitherto, the data storage unit is provided between the input and output interface and the ADPCM device, however the data storage unit can be an ordinary memory and a single memory is satisfactory when dividing the memory into a plurality of areas corresponding to the respective input and output interfaces. Further, the corresponding data can be stored in respective memories in the respective input and output interfaces. Still further, the above storage unit can be built-in in the ADPCM compression and expansion device and in such instance the data storage unit is eliminated.

Further, in the present embodiment many kinds of timing signals are inputted from the channel and the like control unit to the input and output interface, however, the many kinds of the timing signals can be generated inside the input and output interface and the data storage device, and when same timing signals from the channel and the like control unit are applied to the data storage unit as well as to the input and output interface, such timing signals can be applied to the input and output interface via the data storage unit.

I claim:

1. A multi channel ADPCM compression and expansion device comprising:

N sets (N is an integer greater than 1) of input and output interfaces which are connected in parallel with a transmitter and receiver side line and a digital telecommunication network side line which transmits and receives PCM data in a predetermined signal transmission slot, which receive data of K bits from the transmitter and receiver side line and send out data of M bits (wherein K and M are integers such that K<M) to the digital telecommunication network side line, and which receive data of M bits from the digital telecommunication network side line and send out data of K bits to the transmitter and receiver side line;

an ADPCM compression and expansion device which expansively converts data of K bits in a form of ADPCM signals into PCM signals of M bits in response to a first control signal and outputs the same and compressively converts data of M bits in a form of PCM signals into ADPCM data of K bits in response to a second control signal; and a control unit which divides the signal transmission slot interval into N sections and successively selects said N sets of input and output interfaces in a predetermined order during respective divided intervals divided into N sections, and successively performs during the respective divided intervals a first control which generates the first control signal and then sends the data of K bits from the selected input and output interface to said ADPCM compression and expansion device and which receives the expansively converted M bit data from said ADPCM compression and expansion device and then returns the same to the selected input and output interface, and a second control which generates the second control signal and then sends the M bit data from the elected input and output interface to said ADPCM compression and expansion device and which receives the compressively converted K bit data from said ADPCM compression and expansion device and then returns the same to the selected input and output interface, wherein the compressive conversion and the expansive conversion of said ADPCM compression and expansion device are completed in an interval shorter than ½ of the divided interval.

2. The multi channel ADPCM compression and expansion device according to claim 1, wherein said ADPCM compression and expansion device is designed to allot a same processing step for a calculation processing which allows a common performance for the compression conversion and for the expansion conversion among respective processing steps for the compression conversion and for the expansion conversion.

3. The multi channel ADPCM compression and expansion device according to claim 2, wherein, the second control signal is an inverted signal of the first control signal, and said control unit separates the divided interval into former half and a latter half, sets the M bit data from the digital network side line at the selected input and output interface during initial stage in the former half, generates the second control signal, then sends out the K bit data returned to the selected input and output interface to the receiver side line at the ending moment of the former half, and sets the K bit data from the receiver side line at the input and output interface during the initial stage in the latter half, generates the first control signal, then sends out the M bit data returned to the selected input and output interface to the digital network side line at the ending moment of the latter half.

4. The multi channel ADPCM compression and expansion device according to claim 2, wherein, the second control signal is an inverted signal of the first control signal, and said control unit separates the divided interval into former half and latter half, sets the K bit data from the receiver side line at the selected input and output interface during initial stage in the former half, generates the first control signal, then sends out the M bit data returned to the selected input and output interface to the digital network side line at the ending moment of the former half, and sets the M bit data from the digital network side line at the input and output interface during initial stage in the latter half, generates the second control signal, then sends out the K bit data returned to the selected input and output interface to the receiver side line at the ending moment of the latter half.

5. The multi channel ADPCM compression and expansion device according to claim 2, wherein the second control signal is an inverted signal of the first control signal and respective corresponding storage units, each of which stores a plurality of past data and past calculation results of said ADPCM compression and expansion device, are provided between a plurality of the respective input and output interfaces and said ADPCM compression and expansion device, and these stored data together with the data set at the selected input and output interface being read in by said ADPCM compression and expansion device.

6. The multi channel ADPCM compression and expansion device according to claim 5, wherein said ADPCM compression and expansion device includes a counter, a plurality of calculation units each of which performs different calculation processings necessary for the compression conversion and for the expansion conversion and a numeric value generation unit which generates a predetermined numeric value depending on an input data condition, and either the plurality of the calculation units or the numeric value generation unit is selected depending on a count value of the counter and then the calculation processing is performed, and through successive renewal of the count value of the counter, ADPCM processings at respective steps are successively performed and a step having same count value of the counter is allotted for a calculation processing which allows performance common for the compression conversion and for the expansion conversion.

7. The multi channel ADPCM compression and expansion device according to claim 6, wherein steps having different count values of the counter but continuing from the same count value for the common calculation processing are respectively allotted to calculation processings inherent to the compression conversion and to the expansion conversion, during the compression conversion the steps having the different count values allotted for the expansion conversion being skipped and during the expansion conversion the steps having the different count values allotted for the compression conversion being skipped.

8. The multi channel ADPCM compression and expansion device according to claim 7, further comprising, an input and output path switching circuit which includes a plurality of input bit terminals and a plurality of output bit terminals, selectively sets a path from the input to the output for the input bit terminals and the output bit terminals upon receipt of a count value of the counter and according to the count value and outputs an input data, and a temporary storage register, wherein the plurality of the calculation units, the numeric value generation unit and the register being respectively connected to the plurality of the input bit terminals and the plurality of the output terminals, and the input data and at least one of the plurality of the calculation units being selected according to the count value of the counter.

9. The multi channel ADPCM compression and expansion device according to claim 8, wherein the plurality of the calculation units include a calculation unit which performs multiplication, addition and subtraction, a complementing unit and a shifter, and these calculation units and the numeric value generation unit being respectively constituted by a gate logic and generating a calculation result after a predetermined time delay.

10. The multi channel ADPCM compression and expansion device according to claim 9, wherein a count starting value and a count ending value of the counter for the compression conversion steps and for the expansion conversion steps are determined identical.

11. The multi channel ADPCM compression and expansion device according to claim 10, wherein a time sharing multiple control unit being connected to the receiver side line and further connected cordlessly to a transmitter and receiver, and signal transmission and reception between the transmitter and receiver and the time sharing multiple control unit being performed via ADPCM signals.

* * * * *